(12) United States Patent
Kudo et al.

(10) Patent No.: US 10,761,035 B2
(45) Date of Patent: Sep. 1, 2020

(54) DIAGNOSIS SUPPORT APPARATUS, DIAGNOSIS SUPPORT METHOD, DIAGNOSIS METHOD, AND REPAIR METHOD OF VACUUM DEGASSING TANK

(71) Applicant: NIPPON STEEL CORPORATION, Tokyo (JP)

(72) Inventors: Susumu Kudo, Tokyo (JP); Michio Nitta, Tokyo (JP); Masaki Miyashita, Tokyo (JP); Seiya Fujita, Tokyo (JP); Naoki Watabe, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/478,070

(22) PCT Filed: Dec. 6, 2017

(86) PCT No.: PCT/JP2017/043790
§ 371 (c)(1),
(2) Date: Jul. 15, 2019

(87) PCT Pub. No.: WO2018/154910
PCT Pub. Date: Aug. 30, 2018

(65) Prior Publication Data
US 2019/0360944 A1 Nov. 28, 2019

(30) Foreign Application Priority Data
Feb. 27, 2017 (JP) .................................. 2017-035438

(51) Int. Cl.
*G01N 21/954* (2006.01)
*F27D 21/02* (2006.01)
(Continued)

(52) U.S. Cl.
CPC ........... *G01N 21/954* (2013.01); *F27D 21/02* (2013.01); *G01B 11/30* (2013.01); *G01N 2021/8845* (2013.01); *G01N 2201/021* (2013.01)

(58) Field of Classification Search
CPC ......... G01N 21/954; G01N 2021/8845; G01N 2201/021; F27D 21/02; G01B 11/30;
(Continued)

(56) References Cited

U.S. PATENT DOCUMENTS 9,116,134 B2 * 8/2015 Satou ...................... B21C 37/06
2012/0249778 A1 * 10/2012 Satou ................... G01B 11/105
348/125

(Continued)

FOREIGN PATENT DOCUMENTS

CN 105392904 A 3/2016
CN 106594485 A 4/2017
(Continued)

OTHER PUBLICATIONS

International Search Report for PCT/JP2017/043790 (PCT/ISA/210) dated Feb. 13, 2018.
(Continued)

*Primary Examiner* — Roy M Punnoose
(74) *Attorney, Agent, or Firm* — Birch, Stewart, Kolasch & Birch, LLP

(57) ABSTRACT

This diagnosis support apparatus is a diagnosis support apparatus of a vacuum degassing tank having an immersion tube that extends downward, the diagnosis support apparatus including a camera that is configured to capture an image of an inner circumferential surface of an immersion tube seen from below at an angle in a state of being disposed outside the inner circumferential surface of the immersion tube in a plan view and acquire the image as data and an image (Continued)

processor that is configured to be connected to the camera and carry out image-processing of the data.

16 Claims, 7 Drawing Sheets

(51) Int. Cl.
  *G01B 11/30* (2006.01)
  *G01N 21/88* (2006.01)
(58) Field of Classification Search
  CPC ....... G01B 11/06; G01B 11/105; B21C 37/06; B21C 51/00; C21C 7/10
  USPC .......................................................... 356/600
  See application file for complete search history.

(56) References Cited

U.S. PATENT DOCUMENTS

2012/0307040 A1* 12/2012 Shukla ................ G01N 21/954
  348/84
2016/0148365 A1  5/2016 Tsuda et al.
2016/0364851 A1* 12/2016 Konishi ............... G01N 21/954

FOREIGN PATENT DOCUMENTS

| JP | 6-158145 A | 6/1994 |
| JP | 7-159054 A | 6/1995 |
| JP | 2002-90124 A | 3/2002 |

OTHER PUBLICATIONS

Office Action issued in TW Application No. 106142736 dated Nov. 20, 2018.

Written Opinion of the International Searching Authority for PCT/JP2017/043790 (PCT/ISA/237) dated Feb. 13, 2018.

Extended European Search Report, dated Mar. 19, 2020, for counterpart European Application No. 17897305.3.

* cited by examiner

DIAGNOSIS SUPPORT APPARATUS, DIAGNOSIS SUPPORT METHOD, DIAGNOSIS METHOD, AND REPAIR METHOD OF VACUUM DEGASSING TANK

TECHNICAL FIELD OF THE INVENTION

The present invention relates to a diagnosis support apparatus, a diagnosis support method, a diagnosis method, and a repair method of a vacuum degassing tank.

Priority is claimed on Japanese Patent Application No. 2017-035438, filed Feb. 27, 2017, the content of which is incorporated herein by reference.

RELATED ART

In a series of refining steps for manufacturing clean steel, in many cases, vacuum degassing by an RH method or a DH method (RH process or DH process) is carried out on molten steel. In vacuum degassing, vacuum degassing tanks (RH degassing tanks or DH degassing tanks) are used.

FIG. 1 shows a cross-sectional view of an RH degassing tank 100 as an example of the vacuum degassing tanks. The RH degassing tank 100 includes an upper portion tank 101, a middle portion tank 102, a lower portion tank 103, and two immersion tubes 104 sequentially from top to bottom. The two immersion tubes 104 respectively extend downward from the bottom of the lower portion tank 103. The inner walls of the immersion tubes 104 and the lower portion tank 103 are configured using a refractory (hereinafter, also referred to as "the lining refractory $\alpha$"). During an RH process, the two immersion tubes 104 are immersed in molten steel in a ladle (not illustrated), and the inside of the RH degassing tank 100 is evacuated. In addition, an inert gas (for example, argon gas) is blown into a first immersion tube 104. Therefore, the molten steel moves up in the first immersion tube 104, passes through the inside of the lower portion tank 103, and moves down in a second immersion tube 104 as shown by arrows in the drawing.

During the RH process, high-temperature molten steel flows in the immersion tubes 104 and the lower portion tank 103. Therefore, cracks are likely to be initiated and propagated in the lining refractory $\alpha$ of "the immersion tubes 104 and the lower portion tank 103 near the immersion tubes". When the propagation of cracks is significant, the lining refractory $\alpha$ drops. In addition, there is a concern that an iron shell that covers the immersion tubes 104 and the lower portion tank 103 may become red-hot and be damaged. The dropping of the lining refractory $\alpha$ causes the infiltration of the refractory (oxide) into the molten steel. The iron shell becoming red-hot and the opening of the iron shell also bring about the introduction of the external air into the RH degassing tank 100, and the generation of an oxide or a decrease in the degree of vacuum is caused. In summary, cracks in the lining refractory $\alpha$ cause the degradation of the quality of the molten steel and the shortening of the service life of the degassing tank and act as a cause for inhibiting the manufacturing of clean steel. Refractory troubles in the present specification refer to the dropping of the lining refractory $\alpha$, the iron shell becoming red-hot, and the opening of the iron shell.

The above-described problem caused by cracks in the lining refractory $\alpha$ is also similarly present in DH processes using a DH degassing tank having only one immersion tube 104.

Therefore, in general, during a period from the end of a previous charge of vacuum degassing to the beginning of a following charge of vacuum degassing, the surface properties of the lining refractory $\alpha$ are diagnosed, and a spray repair or a press-in repair is carried out on cracks that are determined to require repairing. At this time, the molten steel is transported from a converter to the vacuum degassing tank at certain time intervals. For example, a time taken from the end of the previous charge of vacuum degassing to the beginning of the following charge of vacuum degassing is a short period of time (for example, 15 minutes to 25 minutes). The diagnosis of the surface properties of the lining refractory $\alpha$ in the vacuum degassing tank and the repair of the cracks determined to require repairing carried out within the above-described short period of time are required for continuous operations of the vacuum degassing tank. When the surface properties of the lining refractory $\alpha$ are diagnosed and a preferred repair is carried out on the cracks determined to require repairing within the above-described short period of time, it is possible to realize the avoidance of the refractory troubles, the maintenance of the qualities of the molten steel (production of highly clean steel), and the extension of the service life of the vacuum degassing tank without stopping the continuous operations of the vacuum degassing tank, and it becomes possible to increase the efficiency of vacuum degassing.

Among these repair methods, the spray repair can be carried out online, that is, without waiting a decrease in the temperature of the lining refractory $\alpha$ within a short period of time. On the other hand, the press-in repair is a larger-scale repair technique compared to the spray repair, requires of a time of several hours, and needs to be carried out offline, that is, after a decrease in the temperature of the lining refractory $\alpha$. Therefore, in order to carry out a repair within a short period of time, it is desirable to carry out the spray repair that can be carried out within a shorter period of time than the press-in repair.

In order to carry out the diagnosis of the surface properties of the lining refractory $\alpha$ within a short period of time, it is desirable to rapidly carry out the repair in detail without cooling the immersion tubes 104 in a high-temperature state immediately after vacuum degassing. In addition, in the case of cooling the lining refractory $\alpha$ in order for the diagnosis, there is a concern that the lining refractory $\alpha$ may be damaged due to the cooling. Therefore, it is desirable to determine the necessity of a repair and selecting a repair method without cooling the lining refractory $\alpha$.

Patent Document 1 discloses a thermal spray repair method of an RH degassing furnace in which a central portion of a canopy of the RH degassing furnace is opened, a thermal spray burner and a lance are inserted into the furnace through this opening portion, a camera for observing the inside of the furnace is inserted through an immersion tube, damaged places of a lining refractory are confirmed using the camera for observing the inside of the furnace, and the damaged places of the lining refractory are repaired by thermal spraying by operating the thermal spray burner and the lance.

However, in a case where the camera for observing the inside of the furnace is inserted into the immersion tube in a high-temperature state immediately after an RH process using the technique disclosed by Patent Document 1, there is a concern that molten substances (for example, a slag and a scull) remaining in the RH degassing tank may drip from the immersion tube and the camera may be broken. In this case, it is not possible to carry out accurate diagnoses. Therefore, in the technique disclosed by Patent Document 1, a waiting time for the molten substances to stop dripping from the immersion tube after the RH process becomes necessary, and the efficiency of vacuum degassing decreases. In addition, in the case of visually observing the immersion tube, it is necessary to observe the immersion tube from a distance from the viewpoint of safety. In this case, it is difficult to carry out accurate diagnoses.

When it is not possible to carry out an accurate diagnosis, not only is the necessity of a repair misjudged, but the selection of a repair method is also misjudged. As a result, there is a concern that the refractory troubles may be caused and the degradation of the qualities of molten steel (for example, the infiltration of inclusions derived from a refractory into the molten steel) and the shortening of the service lives of vacuum degassing tanks may be caused. In addition, there are cases where the continuous operations of vacuum degassing tanks are stopped and thus, conversely, an excess repair cost may be incurred.

PRIOR ART DOCUMENT

Patent Document

[Patent Document 1] Japanese Unexamined Patent Application, First Publication No. H6-158145

DISCLOSURE OF THE INVENTION

Problems to be Solved by the Invention

The present invention has been made in consideration of the above-described circumstances, and an object of the present invention is to provide a diagnosis support apparatus, a diagnosis support method, a diagnosis method, and a repair method of vacuum degassing tanks which are capable of increasing the efficiency of vacuum degassing.

Means for Solving the Problem

The outline of the present invention is as described below.

(1) A first aspect of the present invention is a diagnosis support apparatus of a vacuum degassing tank having an immersion tube that extends downward, the apparatus including a camera that is configured to capture an image of an inner circumferential surface of the immersion tube seen from below at an angle in a state of being disposed outside the inner circumferential surface of the immersion tube in a plan view and acquire the image as data and an image processor that is configured to be connected to the camera and carry out image-processing of the data.

(2) The diagnosis support apparatus according to (1) may further include a table to which the camera is fixed and a moving mechanism that is configured to move the table between an image capturing position at which the camera is disposed at a position at which the camera is not overlaid by the inner circumferential surface of the immersion tube in the plan view and an evacuation position at which the camera is disposed at a position at which the camera is not overlaid by the vacuum degassing tank in the plan view.

(3) In the diagnosis support apparatus according to (2), the moving mechanism may include a supporting column that extends in a vertical direction and an arm that extends from the supporting column in a horizontal direction and is configured to support the table so as to be capable of circling around an axis of the supporting column.

(4) The diagnosis support apparatus according to (2) or (3) may further include a storage case that is fixed to the table and is configured to store the camera, and at least a part of an upper surface of the storage case may be heat-resistant glass.

(5) In the diagnosis support apparatus according to (4), the storage case may include a lid that is configured to cover at least a part of the heat-resistant glass and a lid-opening and closing mechanism that is configured to open and close the lid so that the lid is opened when the table is at the image capturing position and the lid is in a closed state when the table is being moved.

(6) The diagnosis support apparatus according to (4) or (5) may further include a gas supply mechanism that is configured to supply gas to an inside of the storage case.

(7) The diagnosis support apparatus according to any one of (4) to (6) may further include a thermometer that is configured to measure a temperature of an inside of the storage case.

(8) The diagnosis support apparatus according to any one of (1) to (7) may further include a camera control unit that is configured to capture a plurality of the images while changing an exposure time of the camera in a range of 5 ms to 300 ms.

(9) In the diagnosis support apparatus according to any one of (1) to (8), the camera may image capture the inner circumferential surface of the immersion tube in a state of being disposed outside an outer circumferential surface of the immersion tube in the plan view.

(10) In the diagnosis support apparatus according to any one of (1) to (9), a plurality of the cameras may be disposed around a central axis of the immersion tube in the plan view.

(11) In the diagnosis support apparatus according to (10), the camera may image capture a whole circumference of the inner circumferential surface of the immersion tube.

(12) In the diagnosis support apparatus according to any one of (1) to (9), the camera may image capture, in the inner circumferential surface of the immersion tube, a region closest to a central axis of the vacuum degassing tank in the plan view.

(13) In the diagnosis support apparatus according to any one of (1) to (12), the vacuum degassing tank may be an RH degassing tank having two immersion tubes.

(14) A second aspect of the present invention is a diagnosis support method of a vacuum degassing tank in which the diagnosis support apparatus according to any one of (1) to (13) is used, and the method has a image capturing step capturing an image of the inner circumferential surface of the immersion tube seen from below at an angle using the camera and acquiring data and an image-processing step of image-processing the data acquired in the image capturing step using the image processor.

(15) A third aspect of the present invention is a diagnosis method of a vacuum degassing tank in which the diagnosis support apparatus according to any one of (1) to (13) is used, and the method has an image capturing step of capturing an image of the inner circumferential surface of the immersion tube seen from below at an angle using the camera and acquiring data, an image-processing step of image-processing the data acquired in the image capturing step using the image processor, a crack specification step of specifying presence or absence of cracks and lengths of the cracks in the inner circumferential surface of the immersion tube on the basis of the image-processed data, and a repair technique determination step of determining a necessity of a repair and a repair technique depending on the presence or absence of the cracks and the lengths of the cracks specified in the crack specification step.

(16) A fourth aspect of the present invention is a repair method in which the inner circumferential surface of the immersion tube is repaired using a repair technique determined in the repair technique determination step according to (15).

Effects of the Invention

According to the diagnosis support apparatuses of a vacuum degassing tank according to (1) to (13), the camera captures an image of the inner circumferential surface of the immersion tube seen from below at an angle in a state of being disposed outside the inner circumferential surface of the immersion tube in the plan view, and thus a molten substance does not collide with the camera during image capture even in a harsh image capturing environment in which the molten substance drips from the immersion tube immediately after vacuum degassing. Therefore, it is possible to rapidly and accurately diagnose the properties of the inner circumferential surface of the immersion tube immediately after vacuum degassing. In addition, measurement is possible immediately after the end of vacuum degassing, and thus it is possible to shorten the time necessary for measurement. Therefore, it is possible to realize the avoidance of refractory troubles, the maintenance of the qualities of the molten steel, and the extension of the service life of the vacuum degassing tank without stopping the continuous operations of the vacuum degassing tank, and it becomes possible to increase the efficiency of vacuum degassing.

According to the diagnosis support method of a vacuum degassing tank according to (14) and a diagnosis method of a vacuum degassing tank according to (15), it is possible to rapidly and accurately diagnose or support the diagnosis of the properties of the inner circumferential surface of the immersion tube immediately after vacuum degassing using the diagnosis support apparatus according to (1) to (13). In addition, measurement is possible immediately after the end of vacuum degassing, and thus it is possible to shorten the time necessary for measurement. Therefore, it is possible to realize the avoidance of refractory troubles, the maintenance of the qualities of the molten steel, and the extension of the service life of the vacuum degassing tank without stopping the continuous operations of the vacuum degassing tank, and it becomes possible to increase the efficiency of vacuum degassing.

According to the repair method of a vacuum degassing tank according to (16), the inner circumferential surface of the immersion tube is repaired using an optimal repair method determined in the repair technique determination step according to (15), and thus it is possible to avoid consuming the repair time more than necessary. Therefore, it is possible to increase the efficiency of vacuum degassing.

EMBODIMENTS OF THE INVENTION

The present inventors carried out intensive studies regarding a diagnosis support apparatus, a diagnosis support method, a diagnosis method, and a repair method which are capable of increasing the efficiency of vacuum degassing.

In order to investigate the propagation status of cracks in a lining refractory α, the present inventors carried out image capturing using a camera each time continuous charges of an RH process using a single RH degassing tank ended. Each time the image capturing was carried out, cracks initiated on an inner circumferential surface of an immersion tube (a surface of the lining refractory α) were specified, and the lengths of the cracks were investigated. In addition, a spray repair was carried out in several charges, and no repair was carried out in the remaining charges.

Figure 2:
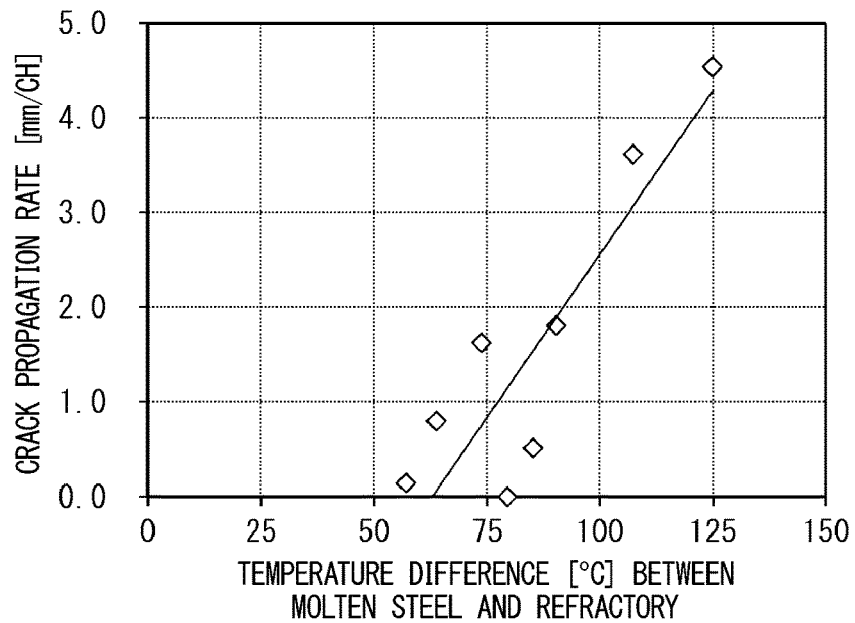
FIG. 2 is a view showing a relationship between "a temperature difference (° C.) between molten steel and a refractory" and "the crack propagation rate (mm/CH)" at the time of the beginning of an RH process.

FIG. 2 is a view showing a relationship between "a temperature difference (° C.) between molten steel and a refractory" and "the crack propagation rate (mm/CH)" at the time of the beginning of the RH process.

"The temperature difference (° C.) between molten steel and a refractory" refers to the temperature difference between "the temperature of molten steel" and "the temperature of a refractory" at the time of beginning the following charge of RH degassing.

"The crack propagation rate" refers to the difference between the lengths of cracks at the time of ending the previous charge and the lengths of cracks at the time of ending the following charge. Furthermore, the length of a crack refers to a straight distance connecting both end portions of the crack.

From FIG. 2, it is found that, when "the temperature difference (° C.) between molten steel and a refractory" exceeds 50° C., cracks begin to propagate. That is, the propagation of cracks depends on the difference between the temperature of molten steel and the temperature of the inner circumferential surface of the immersion tube at the time of beginning the RH process. As the time taken from the end of the previous charge to the beginning of the following charge becomes longer, "the temperature difference (° C.) between molten steel and a refractory" becomes greater due to a decrease in the temperature of the immersion tube. Therefore, when it is possible to rapidly carry out a diagnosis after the end of the previous charge, it is possible to prevent an increase in "the temperature difference (° C.) between molten steel and a refractory". Therefore, it is possible to realize the avoidance of refractory troubles, the maintenance of the qualities of molten steel, and the extension of the service life of the vacuum degassing tank without stopping the continuous operations of a vacuum degassing tank, and it becomes possible to increase the efficiency of vacuum degassing.

Immediately after the end of the previous charge, a harsh status in which a molten substance drips from, particularly, the lower end of the inner circumferential surface of the immersion tube is formed, but the present inventors found that, when image capturing is carried out using a camera disposed at an angle below the immersion tube, it is possible to accurately and rapidly diagnose the properties of the inner circumferential surface of the immersion tube. In addition, the present inventors found that, when image capturing is carried out as described above, it is possible to realize the avoidance of refractory troubles, the maintenance of the qualities of molten steel, and the extension of the service life of the vacuum degassing tank without stopping the continuous operations of a vacuum degassing tank, and it becomes possible to increase the efficiency of RH degassing.

Furthermore, the present inventors carried out numerical analyses under a condition in which "the temperature difference (° C.) between molten steel and a refractory" was set in a range of 80° C. to 120° C. and investigates the relationship between "the lengths (mm) of cracks before a repair" and "the crack propagation rate (mm/CH)" for cases where the spray repair was carried out and cases where the spray repair was not carried out. The results are shown in FIG. 3.

Figure 3:
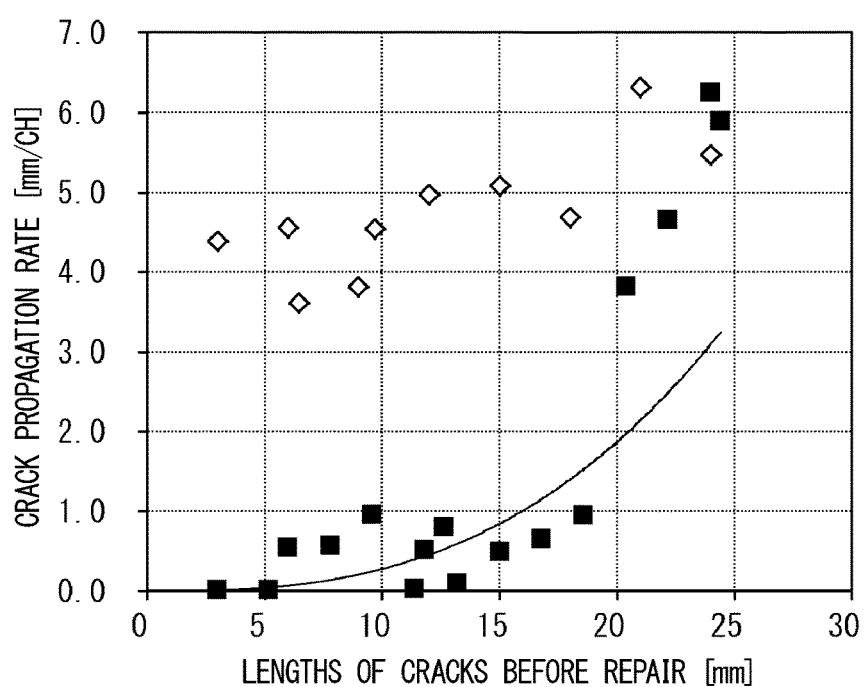
FIG. 3 is a view showing a relationship between "lengths (mm) of cracks before a repair" and "the crack propagation rate (mm/CH)".

As shown in FIG. 3, in a case where "the lengths (mm) of cracks before a repair" are 20 mm or less, an effect of the spray repair appears, and the propagation of the cracks is suppressed. On the other hand, in a case where "the lengths (mm) of cracks before a repair" exceed 20 mm, the effect of the spray repair does not appear, and the propagation of the cracks becomes significant. The above description shows that, in a case where the lengths of cracks are 20 mm or less, the propagation of cracks is sufficiently dealt with by the spray repair; however, in a case where the lengths of cracks exceed 20 mm, the propagation of cracks cannot be sufficiently dealt with by the spray repair, and it becomes necessary to deal with the propagation of cracks by a press-in repair.

Therefore, as long as the inner circumferential surface is rapidly diagnosed during the period of time from the end of the previous charge to the beginning of the following charge, and cracks having a length exceeding a predetermined length (for example, 20 mm) are not observed, when a hot spray repair is carried out, it is possible to realize the avoidance of refractory troubles, the maintenance of the qualities of molten steel, and the extension of the service life of a vacuum degassing tank without stopping the continuous operations of the vacuum degassing tank while preventing the RH degassing tank from being damaged by the propagation of cracks, and it becomes possible to increase the efficiency of RH degassing.

Hereinafter, the present invention based on the above-described finding will be described on the basis of embodiments with reference to drawings.

First Embodiment

Figure 4:
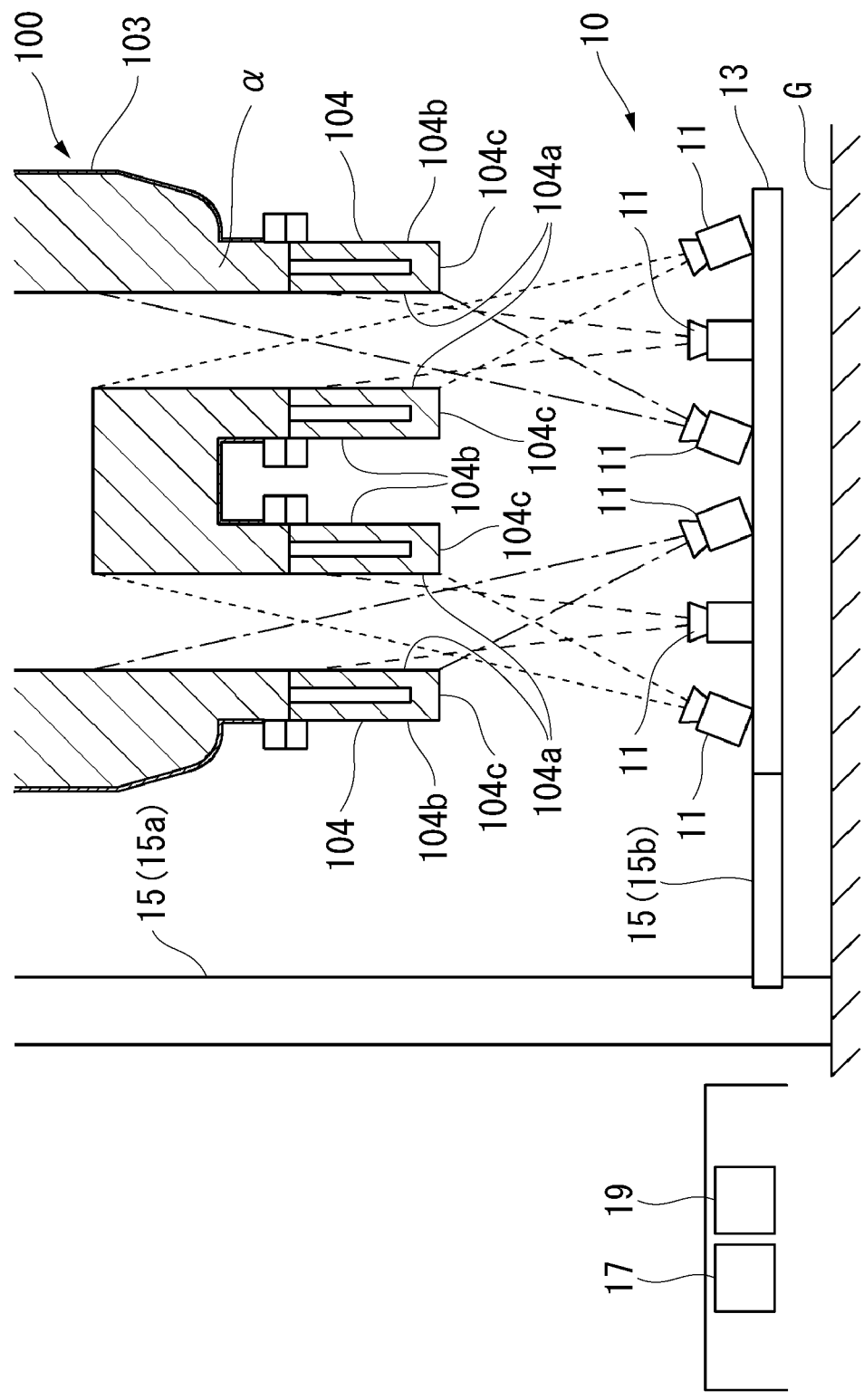
FIG. 4 is a schematic front view of a diagnosis support apparatus 10 during image capture.
Figure 5:
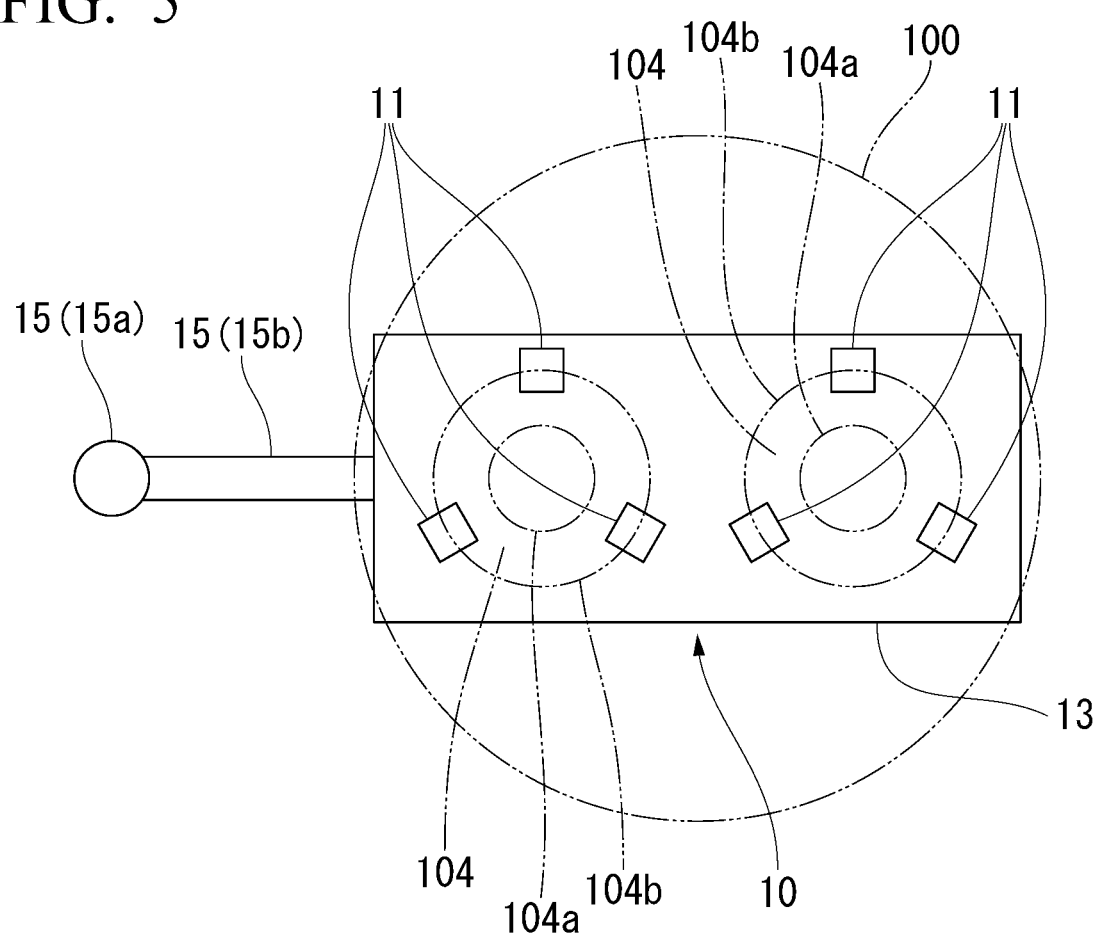
FIG. 5 is a schematic plan view of the diagnosis support apparatus 10 during image capture in which the RH degassing tank 100 is indicated by a two-dot chain line.

FIG. 4 is a schematic front view showing a vacuum degassing tank diagnosis support apparatus 10 (hereinafter, simply referred to as "the diagnosis support apparatus 10") and an RH degassing tank 100, which is a diagnosis subject, according to a first embodiment of the present invention. In addition, FIG. 5 is a schematic plan view showing a positional relationship between the diagnosis support apparatus 10 and the RH degassing tank 100 at the time of image capture.

Figure 1:
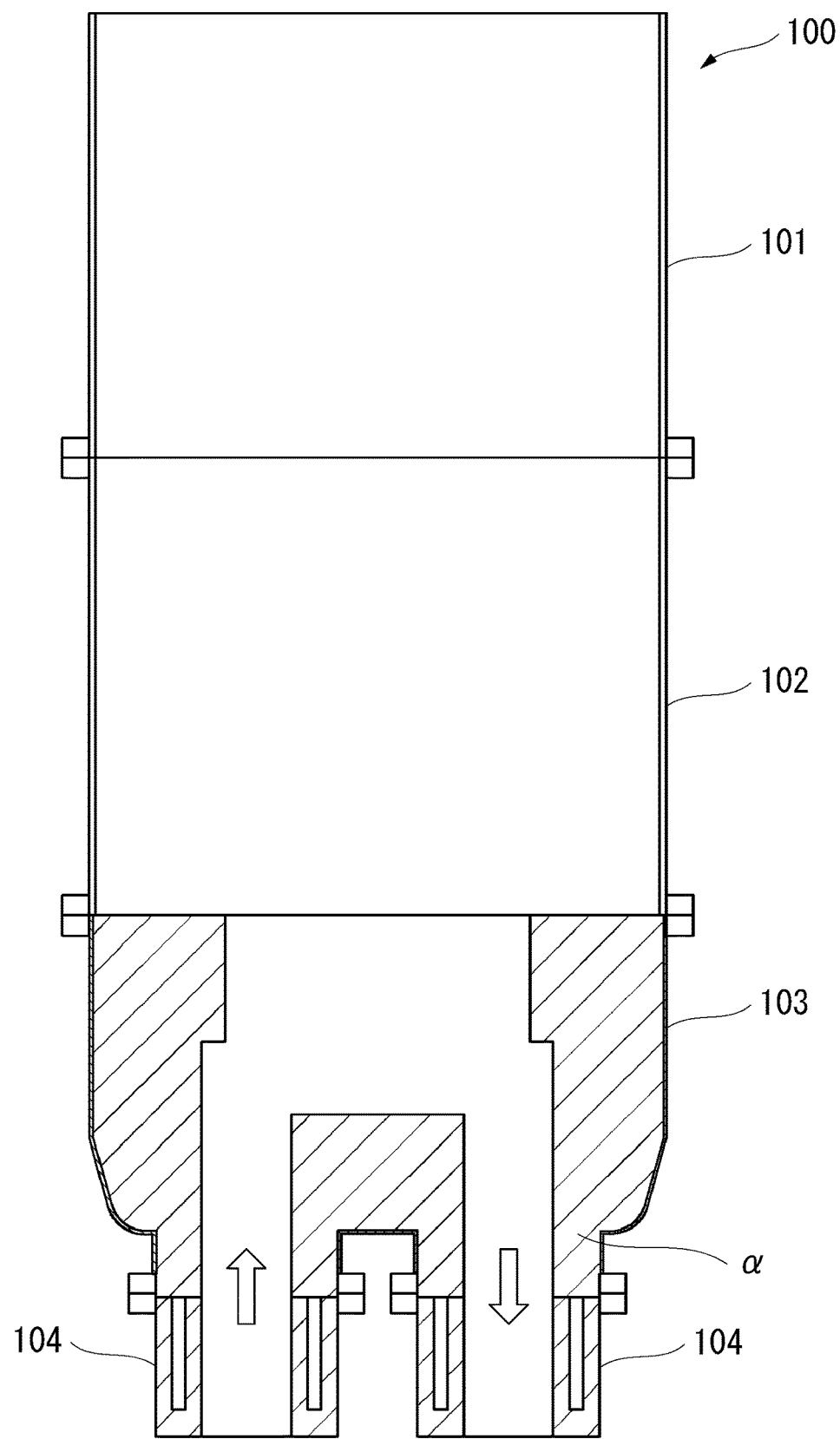
FIG. 1 is a cross-sectional view of an RH degassing tank 100 as an example of a vacuum degassing tank.

As shown in FIG. 4, the diagnosis support apparatus 10 diagnoses, as a subject, the lining refractories α provided on inner circumferential surfaces 104a of two immersion tubes 104 in the RH degassing tank 100 described with reference to FIG. 1. The diagnosis support apparatus 10 supports diagnoses by image capturing the inner circumferential surfaces 104a of the immersion tubes 104 using a plurality of cameras 11 disposed at an angle below the respective immersion tubes 104, acquiring the images as data, and image-processing the data using an image processor 17 connect to the plurality of cameras 11.

Three cameras 11 are provided to each of the two immersion tubes 104 at the time of image capture. That is, a total of six cameras 11 are provided. Immediately after the end of RH degassing, a molten substance drips from, particularly, the inner circumferential surfaces 104a of the immersion tubes 104. Therefore, as shown in FIG. 5, the cameras 11 image capture the inner circumferential surfaces 104a of the immersion tubes 104 from below the RH degassing tank 100 at an angle in a state of being provided outside the inner circumferential surfaces 104a of the immersion tubes 104 in a plan view. Therefore, it becomes possible to prevent the molten substance from dropping and colliding with the cameras 11 at the time of image capturing, and thus it is possible to rapidly image capture the inner circumferential surfaces after RH degassing and to increase the efficiency of RH degassing.

In the diagnosis support apparatus 10 of the present embodiment, the plurality of cameras 11 is disposed at an angle below the immersion tubes 104. That is, the cameras 11 are disposed at positions apart from positions right below the immersion tubes 104. Therefore, even when a high-temperature molten substance drops from the immersion tubes 104 during image capture, the molten substance does not collide with the cameras 11. Therefore, the damage of the cameras 11 can be prevented.

The molten substance also drops from, in the immersion tubes 104, bottom surfaces 104c between the inner circumferential surfaces 104a and outer circumferential surfaces 104b in some cases. Therefore, in order to more reliably prevent the molten substance from colliding with the cameras 11 during image capture, the cameras 11 preferably carry out image capture in a state of being provided outside the outer circumferential surfaces 104b of the immersion tubes 104 in a plan view. When the radius of the outer circumferential surface 104b in a plan view is represented by r, in a case where the cameras 11 are provided at positions apart from the central axes of the immersion tubes 104 in the horizontal direction by more than 2×r, image capturing ranges in the upper end sides of the inner circumferential surfaces 104a of the immersion tubes 104 become narrower. Therefore, the cameras 11 are preferably provided at positions not apart from the central axes of the immersion tubes 104 by more than 2×r in a plan view at the tune of image capture.

In the diagnosis support apparatus 10, three cameras 11 are disposed for a single immersion tube 104 at an angle below the immersion tube 104 at equal angular intervals around the central axis of the immersion tube 104. Therefore, it is possible to image capture the whole circumference region of the inner circumferential surface 104a (specifically, the surface of the lining refractory α) of the immersion tube 104 using three cameras 11.

In order to carry out a diagnosis throughout the whole circumference region of the inner circumferential surface 104a, it is preferable to image capture a single immersion tube 104 using three cameras 11 in diverse directions.

However, in order to shorten the diagnosis time, it is also possible to install one or two cameras 11 for a single immersion tube 104 and diagnose only a partial region of the whole circumference surface of the inner circumferential surface 104a.

In the inner circumferential surface 104a of the immersion tube 104, in a region close to the central axis of the RH degassing tank 100 in a plan view, there is a tendency that cracks are likely to be initiated. Therefore, one or more cameras 11 are preferably disposed at positions at which cameras are capable of image capturing the above-described region.

As shown in FIG. 4, the respective cameras 11 are disposed so as to face upward at an angle, and the light axes thereof are preferably inclined from the central axes of the immersion tubes 104. In this case, it is possible to image capture the inner circumferential surface 104a of a single immersion tube 104 from the lower end to the upper end at once using the respective cameras 11. Therefore, it is possible to image capture the inner circumferential surface 104a of a single immersion tube 104 as a whole using three cameras 11.

The image processor 17 is connected to the respective cameras 11 by wiring or the like (not shown). A monitor 19 is connected to the image processor 17. The image processor 17 and the monitor 19 are disposed at a place apart from the RH degassing tank 100 (for example, an operator room). The image processor 17 carries out image processing on data of the images of the inner circumferential surfaces 104a of the immersion tubes 104 image captured by the cameras 11. In addition, the image processor 17 displays the images on the monitor 19. Therefore, it is possible to determine cracks and specify the cracks and the lengths thereof.

At the time of image capturing the inner circumferential surfaces 104a of the immersion tubes 104, the immersion tubes 104 are in a high-temperature state immediately after the RH process, and the lining refractories α in the immersion tubes 104 emit light for themselves due to heat dissipation. Therefore, it is possible to image capture the lining refractories without lighting. At this time, crack portions particularly strongly emit light for themselves, and, on the other hand, sound portions without cracks emit light for themselves only weakly. In addition, crack portions are shadowed in some cases. This is because protrusions and recesses are generated between the crack portions and the surface of the refractory in the vicinities of the crack portions. Therefore, in captured images, crack portions are displayed to be brighter or darker than sound portions.

The image processor 17 carries out image-processing on the data of the images captured by the cameras 11 so that the light and dark of the images becomes clear. In addition, the image processor 17 displays the images on the monitor 19. Therefore, it is possible to determine and specify cracks from the light and dark of the images. It is needless to say that the lengths of cracks can also be specified. At this time, it is also possible to analyze the images using the image processor 17 and compute the lengths of cracks.

Figure 7:
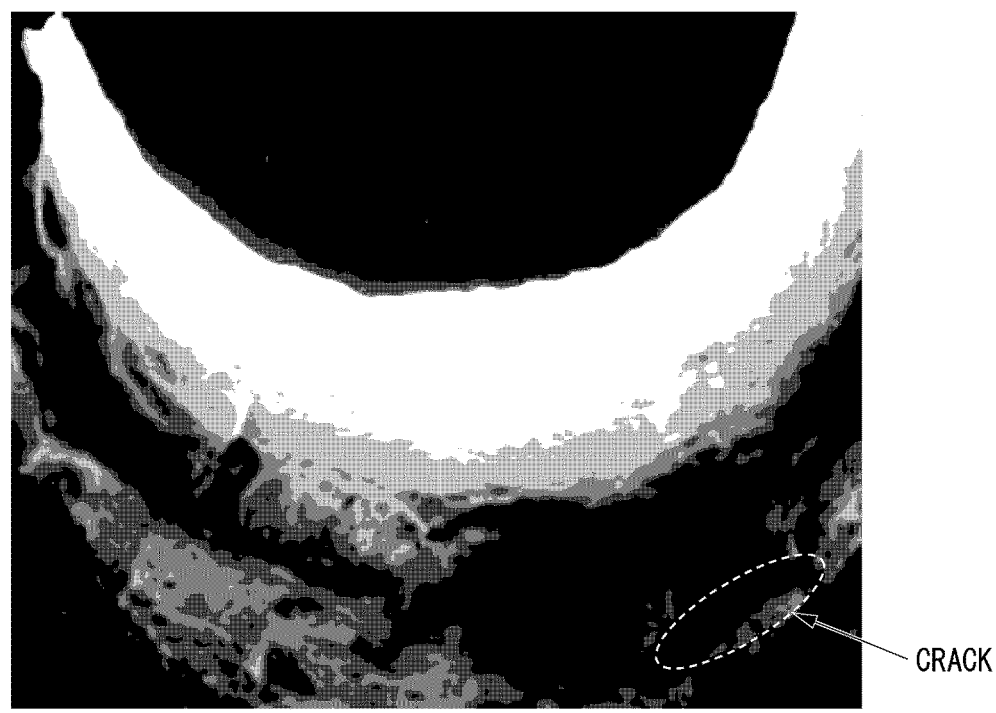
FIG. 7 is a captured image of an inner circumferential wall image-processed by an image processor.

FIG. 7 is a captured image of the inner circumferential surface 104a which has been image-processed by the image processor 17. In the example shown in FIG. 7, a shadow that linearly extends in the circumferential direction of the inner circumferential surface 104a can be visually confirmed, and this can be specified as a crack. In particular, any operators who are sufficiently experienced in the repair of high-temperature RH gas tanks are capable of easily determining and specifying the presence or absence of cracks by visually confirming images captured by the cameras 11. Similarly, the cameras 11 are in a fixed state during image capture, and the dimensions of the RH degassing tank are also identical, and thus it is possible to easily measure the lengths of cracks from captured images using a method such as comparison with captured images of the RH degassing tank in a cold state to which a scale or the like is attached.

Naturally, the contour of the lining refractory α can also be determined, and thus it is also possible to specify the damage status of the lining refractory α by melting.

Therefore, it is possible to accurately diagnose the surface properties (the presence or absence of cracks and the lengths of cracks) of the lining refractories α in the immersion tubes 104, and it is possible to appropriately determine the necessity of a repair and appropriately select a repair method (specifically, an online spray repair or an offline press-in repair).

As the camera 11, a well-known camera (for example, a CCD camera or a CMOS camera) may be applied. In addition, as the image processor 17 as well, a well-known image processor (for example, a personal computer) may be applied. As the monitor 19 as well, a well-known monitor may be applied. However, generally, the average grain size of an aggregate of the lining refractory α is approximately 3 to 5 mm. The average grain size of a repair material that is used for the repair of cracks is approximately 1 mm. Therefore, desirably, it is possible to specify cracks having a length of approximately a minimum of 1 mm. Therefore, the performance (the number of pixels and the definition) of the camera 11, the image processor 17, and the monitor 19 is desirably selected so that cracks having a length of approximately a minimum of 1 mm can be specified.

A photographic subject of the cameras 11 is the lining refractory α in a high-temperature state (a self-light emission state) immediately after the RH process. Therefore, the camera 11 preferably has performance enabling the image capturing of the lining refractory α (the inner circumferential surface 104a of the immersion tube 104), which is the photographic subject, when emitting light for itself due to heat. The temperature of the photographic subject in a self-light emission state is, for example, 500° C. to 1700° C.

The inner circumferential surfaces 104a of the immersion tubes 104 immediately after the RH degassing process emit light for themselves due to heat dissipation, and thus there is a case where, depending on the relationship between the setting of the exposure time of the cameras 11 and the luminance of the photographic subject, it is not possible to accurately determine the presence or absence of cracks on the inner circumferential surfaces 104a with a single round of image capturing. Therefore, the diagnosis support apparatus 10 preferably includes a camera control unit that is configured to control the cameras 11 so as to change the exposure time of the cameras 11 every time of image capture and carry out image capturing a plurality of times. For example, a plurality of images are captured using the respective cameras 11 while changing the exposure time in a range of 5 ms to 300 ms, and, from the captured images, appropriately captured images are selected and used, whereby it is possible to carry out accurate diagnoses. In a case where the lining refractory α in a high-temperature state immediately after the RH process is the photographic subject, for example, the lining refractory is preferably image captured 10 to 20 times while changing the exposure time in a range of 5 ms to 100 ms. In a case where the lining refractory α in a low-temperature state immediately after spraying or the like is the photographic subject, for example, the lining refractory is preferably image captured 15 to 30 times while changing the exposure time in a range of 10 ms to 200 ms.

In the diagnosis support apparatus 10 according to the present embodiment, as shown in FIG. 4, the six cameras 11 are fixed onto a single table 13, and the table 13 can be moved using a moving mechanism 15. Therefore, the inner circumferential surfaces 104a of the immersion tubes 104 immediately after the RH degassing process can be rapidly image captured by moving the six cameras 11 at the same time. Positions at which the cameras 11 are fixed onto the table 13 are set to positions that, when the cameras are disposed at image capturing positions described below, are almost equally distant from the respective central axes of the two immersion tubes 104, are not overlaid by the inner circumferential surfaces 104a, and are slightly apart from the inner circumferential surfaces 104a.

Figure 6:
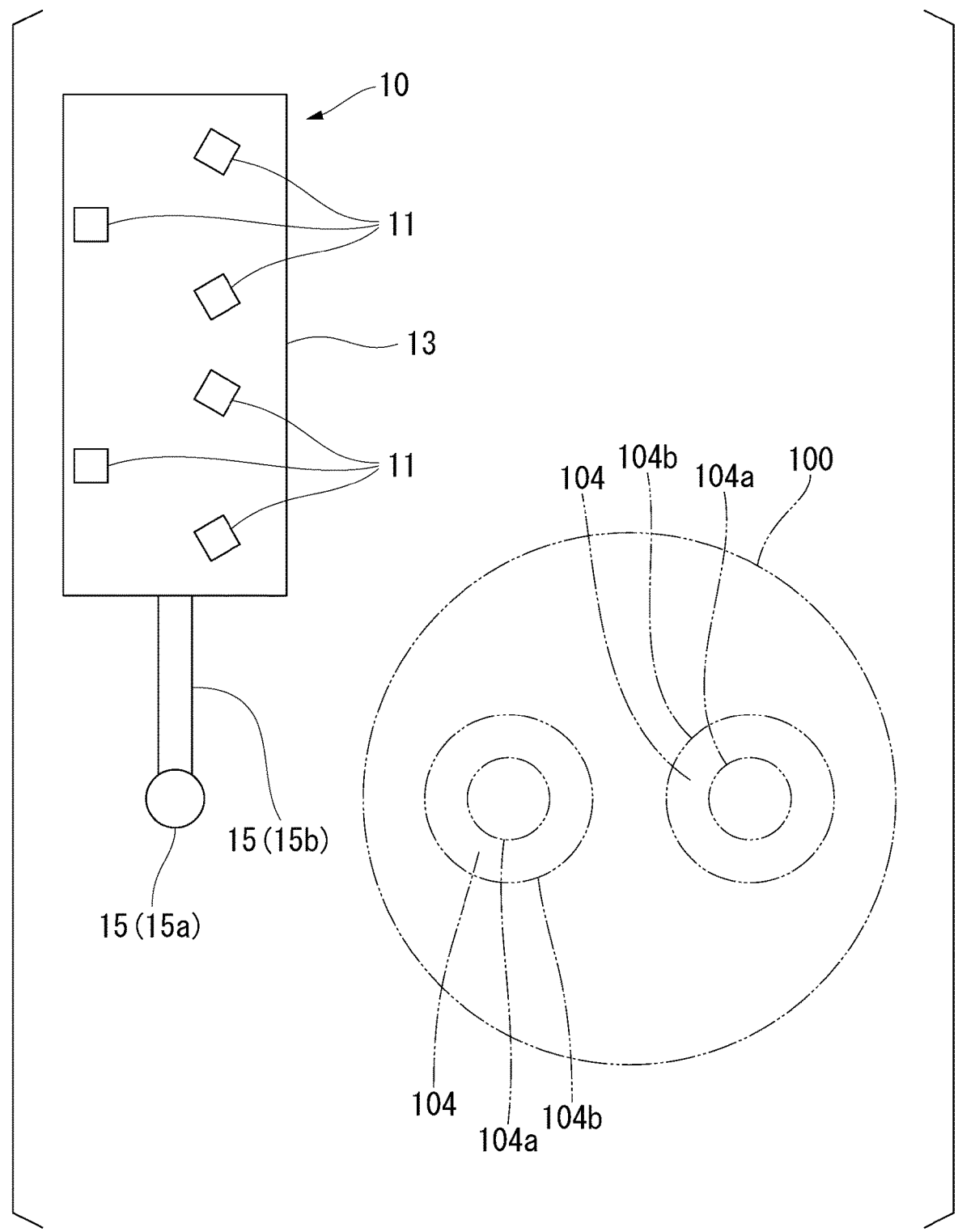
FIG. 6 is a schematic plan view of the diagnosis support apparatus 10 during evacuation in which the RH degassing tank 100 is indicated by a two-dot chain line.

The moving mechanism 15 moves the table 13 between an image capturing position shown in FIG. 5 and an evacuation position shown in FIG. 6.

At the image capturing position, the table 13 is disposed at a position that becomes right below the RH degassing tank 100, and thus the cameras 11 are disposed at positions at which the cameras are not overlaid by the inner circumferential surfaces 104a of the immersion tubes 104 in a plan view.

At the evacuation position, the table 13 is disposed at a position apart from right below the RH degassing tank 100, and thus the cameras 11 are disposed at positions at which the cameras are not overlaid by the RH degassing tank 100 in a plan view.

As shown in FIG. 4 to FIG. 6, the moving mechanism 15 is configured of a supporting column 15a that extends from a ground surface G in the vertical direction and an arm 15b that extends from the supporting column 15a in the horizontal direction and is configured to support the table 13 so as to be capable of circling around the axis of the supporting column 15a.

According to this configuration, the table 13 can be simply moved between the image capturing position and the evacuation position only by the circling of the arm 15b. Therefore, a time necessary for a diagnosis is restrained to, for example, three minutes or shorter (also possibly within 70 seconds). For example, the image capturing time by the cameras 11 is approximately shorter than 10 seconds to one minute, and the movement time of the table 13 is one to two minutes. The time necessary for a diagnosis mentioned herein refers to the sum of the movement time of the table 13 from the evacuation position to the image capturing position, the image capturing time of the cameras 11, and the processing time of images.

Hereinafter, an example of the timing of moving the table 13 will be described.

During the previous charge of the RH process, the table 13 is placed at the evaluation position. After the RH process, the RH degassing tank 100 moves up, and a ladle (not shown) is transported to the next step. After that, the arm 15b circles, and the table 13 moves to the image capturing position. In addition, the cameras 11 carry out image capturing at the image capturing position.

When the diagnosis ends, the arm 15b circles, and the table 13 moves to the evacuation position. In addition, a repair is carried out as necessary using an appropriate method in a state in which the table 13 has moved to the evacuation position, and the preparation of the following charge of the RH process is begun.

As such, according to the diagnosis support apparatus 10 of the present embodiment, it is possible to accurately diagnose the surface properties (the presence or absence of cracks and the lengths of cracks) of the lining refractories α in the immersion tubes 104. Therefore, it is possible to appropriately determine the necessity of a repair and appropriately select a repair method. As a result, it is possible to repair cracks using an appropriate method, and it becomes possible to increase the efficiency of RH degassing.

In the diagnosis support apparatus 10 according to the present embodiment, storage cases 30 that are configured to store the cameras 11 may be fixed to the table 13 in order to prevent the collision of a molten substance dripping from the immersion tubes 104 in the middle of moving the table 13 with the cameras 11 or the collision of a molten substance that collides with the table 13 during image capture and is bounced back with the cameras 11. Hereinafter, this configuration will be described in detail on the basis of FIG. 8.

Figure 8:
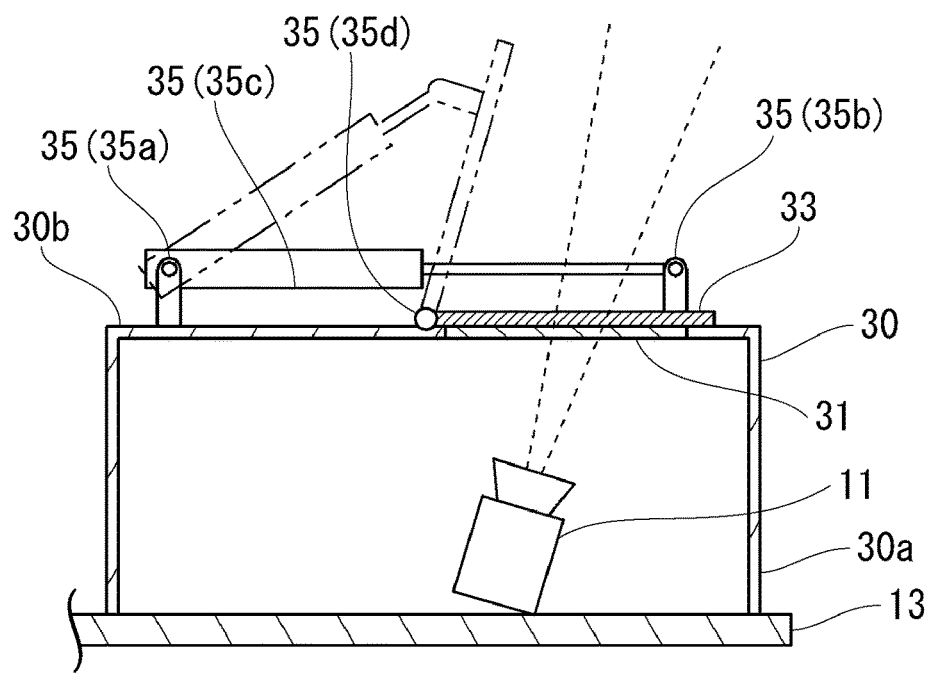
FIG. 8 is a schematic pattern diagram showing a structure in a case where the diagnosis support apparatus 10 includes a storage case 30 of a camera 11.

FIG. 8 is a schematic view of a peripheral structure of the cameras 11 seen in the horizontal direction in a case where the diagnosis support apparatus 10 includes the storage cases 30. As shown in FIG. 8, the storage case 30 has a circumferential wall 30a that is provided upright on the upper surface of the table 13 so as to surround the vicinity of the camera 11 and a top board 30b that is provided at the upper edge of the circumferential wall 30a so as to cover a space above the camera 11.

The respective cameras 11 are separately stored in the storage cases 30. A part of the upper surface of each of the storage cases 30 is made of transparent heat-resistant glass 31, and the respective cameras 11 are capable of image capturing the inner circumferential surfaces 104a of the immersion tubes 104 through the heat-resistant glass 31. The heat-resistant glass 31 may be provided throughout the entire region of the upper surface of the storage case 30. As the heat-resistant glass 31, well-known heat-resistant glass may be applied.

Even in a case where the diagnosis support apparatus 10 includes the storage cases 30 and the heat-resistant glass 31, at the image capturing position, the cameras 11 are disposed at positions that are not overlaid by the inner circumferential surfaces 104a of the immersion tubes 104 in a plan view. This is because, although the heat-resistant glass 31 prevents the molten substance dripping from the inner circumferential surfaces 104a from colliding with the cameras 11, when the molten substance collides with the heat-resistant glass 31, there is a concern that the transparency and the like of the heat-resistant glass 31 may be damaged, in some cases, a hole may be opened in the heat-resistant glass 31, the cameras 11 may be damaged, and appropriate image capturing may be inhibited.

A door (not shown) is provided on one side surface of the storage case 30. This is because the door is opened and the posture of the camera 11 is finely tuned.

The cameras 11 image capture the inner circumferential surfaces 104a at the image capturing positions through the transparent heat-resistant glass 31, and thus it is desirable to prevent the breakage of the heat-resistant glass 31. Therefore, as shown in FIG. 8, the storage case preferably has a lid 33 capable of covering the heat-resistant glass 31 and a lid-opening and closing mechanism 35 that is configured to open and close the lid 33. In such a case, it is possible to prevent the molten substance dripping from the immersion tubes 104 in the middle of moving the table 13 from colliding with the upper surface of the heat-resistant glass 31.

The lid 33 is preferably installed so as to cover the entire surface of the heat-resistant glass 31, but may be installed so as to cover only an above portion near the camera 11 in the storage case 30.

In the example shown in FIG. 8, the lid-opening and closing mechanism 35 is configured of a first protrusion 35a, a second protrusion 35b, an air cylinder 35c, and a hinge 35d.

The first protrusion 35a is provided on the upper surface of the storage case 30 so as to protrude upward in the vertical direction.

The second protrusion 35b is provided on the upper surface of the lid 33 so as to protrude upward in the vertical direction.

The air cylinder 35c is rotatably coupled to the front end of the first protrusion 35a at one end and is rotatably coupled to the front end of the second protrusion 35b at the other end.

The hinge 35d rotatably couples the edge portion of the lid 33 and the upper surface of the storage case 30 at a middle position between the first protrusion 35a and the second protrusion 35b.

According to this configuration, the lid 33 rotates around the hinge 35d by the extension and contraction of the air cylinder 35c, and the region of the heat-resistant glass 31 is opened and closed.

The lid-opening and closing mechanism 35 preferably controls the opening and closing of the lid 33 so that the lid 33 is opened when the table 13 is at the image capturing position and the lid 33 is in a closed state when the table 13 is being moved. In this case, even when a high-temperature molten substance drops from the inner circumferential surfaces 104a of the immersion tubes 104 in the middle of the movement of the table 13, it is possible to prevent the molten substance from colliding with the heat-resistant glass 31.

Hereinafter, an example of the timing of moving the table 13 in a case where the diagnosis support apparatus 10 includes the storage case 30, the heat-resistant glass 31, the lid 33, and the lid-opening and closing mechanism 35 will be described.

During the previous charge of the RH process, the table 13 is placed at the evacuation position. At this time, the lids 33 on the heat-resistant glass 31 are preferably in a closed state. After the RH process, the RH degassing tank 100 moves up, and the ladle (not shown) is transported to the next step. After that, the arm 15b circles, and the table 13 moves to the image capturing position with the lids 33 in a closed state. In addition, at the image capturing position, the air cylinders 35c are operated, the lids 33 are opened, and the cameras 11 carry out image capturing.

When the diagnosis ends, the air cylinders 35c are operated, and the lids 33 are closed. In addition, the arm 15b circles, and the table 13 moves to the evacuation position with the lids 33 in a closed state. In addition, a repair is carried out as necessary using an appropriate method in a state in which the table 13 has moved to the evacuation position, and the preparation of the following charge of the RH process is begun.

The diagnosis support apparatus 10 preferably further includes a gas supply mechanism that is configured to supply gas to the inside of the storage cases 30. In this case, the pressures in the storage cases 30 become higher than the pressure (atmospheric pressure) outside the storage cases 30 due to the supply of gas having a normal temperature to the inside of the storage cases 30. Therefore, dust outside the storage cases 30 does not intrude into the inside of the storage cases 30. As a result, the malfunction of the cameras 11 caused by dust can be prevented. In addition, gas is circulated in the inside of the storage cases 30 due to the supply of gas to the inside of the storage cases 30. Therefore, the temperatures in the inside of the storage cases 30 do not abnormally increase. As a result, the thermal damage of the cameras 11 can be prevented.

As a typical example, the gas that is supplied to the inside of the storage cases 30 is the air. In this case, the gas supply mechanism includes, for example, a pipe, a valve, and a compressor. The pipe connects the storage cases 30 and the compressor. The valve opens and closes the path of the pipe. The compressor generates compressed air. The gas may be an inert gas (for example, argon gas or nitrogen gas).

The diagnosis support apparatus 10 preferably further includes a thermometer that is configured to measure the temperatures of the inside of the storage cases 30. In this case, the temperatures of the inside of the storage cases 30 are monitored using the thermometer. For example, in a case where the temperature of the inside of the storage case 30 exceeds a random temperature, an alarm is sounded or the amount of the gas supplied from the gas supply mechanism is increased. Therefore, the thermal damage of the cameras 11 can be prevented. Furthermore, places for measuring the temperature are not particularly limited, and, for example, the temperatures of the walls inside the storage cases 30 may be measured.

Second Embodiment

Hereinafter, an RH degassing tank diagnosis support method according to a second embodiment of the present invention (hereinafter, simply referred to as "the diagnosis support method") will be described.

Figure 9:
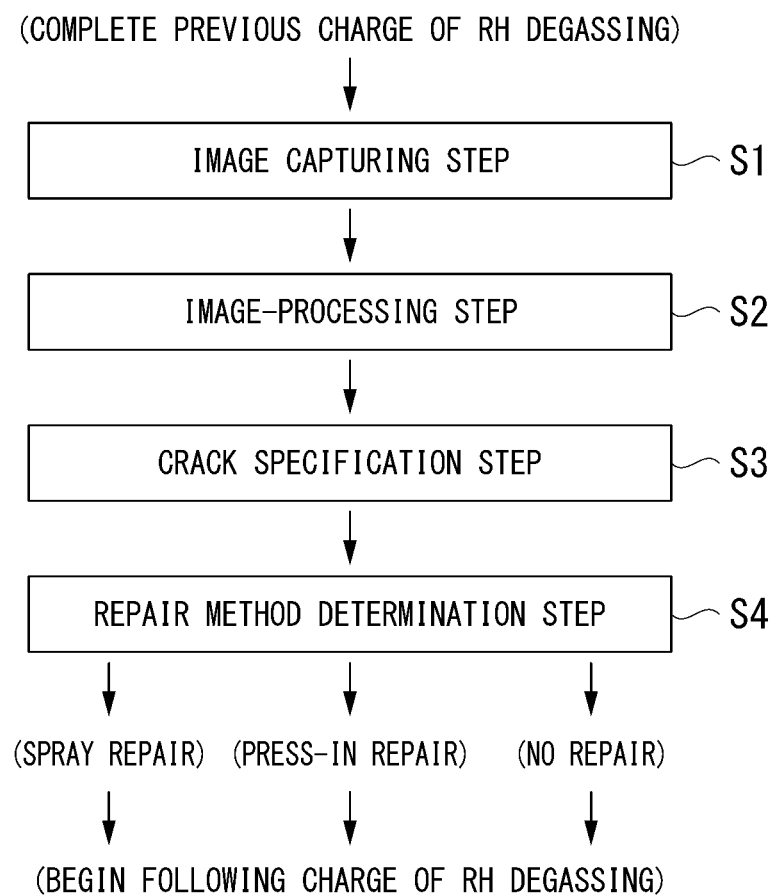
FIG. 9 is a flowchart from the end of the previous charge to the beginning of the following charge.

In the diagnosis support method according to the present embodiment, in a flowchart shown in FIG. 9, a image capturing step S1 and an image-processing step S2 are sequentially carried out. These steps S1 and S2 are carried out in a period of time between the completion of the previous charge of RH degassing and the beginning of the following charge of RH degassing.

First, in the image capturing step S1, after the end of RH degassing, for example, the inner circumferential surfaces 104a of the immersion tubes 104 are image captured using the cameras 11 in the diagnosis support apparatus 10 according to the first embodiment.

Specifically, the cameras 11 image capture the immersion tubes 104 in a high-temperature state immediately after RH degassing in a state of being disposed outside the inner circumferential surfaces 104a of the immersion tubes 104 in a plan view and produce images of the inner circumferential surfaces 104a of the immersion tubes 104 seen from below, and data are acquired.

Next, in the image-processing step S2, the data of the inner circumferential surfaces 104a of the immersion tubes 104 acquired in the image capturing step S1 are image-processed using the image processor.

In the diagnosis support method including the above-described series of steps S1 and S2, it is possible to obtain the images of the inner circumferential surfaces 104a of the immersion tubes 104, and thus it becomes possible to determine the necessity of a repair and a repair technique by specifying the presence or absence of cracks and the lengths of the cracks. Therefore, it is possible to avoid consuming the repair time more than necessary. Therefore, it is possible to carry out a repair to the minimum necessary extent between the previous charge of RH degassing and the following charge of RH degassing, and thus it becomes possible to increase the efficiency of RH degassing.

Third Embodiment

Hereinafter, an RH degassing tank diagnosis method according to a third embodiment of the present invention (hereinafter, simply referred to as "the diagnosis method") will be described.

In the diagnosis method according to the present embodiment, in the flowchart shown in FIG. 9, the image capturing step S1, the image-processing step S2, a crack specification step S3, and a repair technique determination step S4 are sequentially carried out. These steps S1 to S4 are carried out in a period of time between the completion of the previous charge of RH degassing and the beginning of the following charge of RH degassing.

First, in the image capturing step S1, after the end of RH degassing, for example, the inner circumferential surfaces 104a of the immersion tubes 104 are image captured using the cameras 11 in the diagnosis support apparatus 10 according to the first embodiment.

Specifically, the cameras 11 image capture the immersion tubes 104 in a high-temperature state immediately after RH degassing in a state of being disposed outside the inner circumferential surfaces 104a of the immersion tubes 104 in a plan view and produce images of the inner circumferential surfaces 104a of the immersion tubes 104 seen from below, and data are acquired.

Next, in the image-processing step S2, the data of the inner circumferential surfaces 104a of the immersion tubes 104 acquired in the image capturing step S1 are image-processed using the image processor.

In addition, in the crack specification step S3, the presence or absence of cracks generated in the inner circumferential surfaces 104a of the immersion tubes 104 is specified on the basis of the image-processed data. At this time, the lengths of the cracks are also specified. The presence or absence of cracks and the lengths of the cracks may be specified automatically using, for example, the image processor 17 in the above-described diagnosis support apparatus 10.

In addition, in the repair technique determination step S4, the necessity of a repair and a repair technique are determined according to the presence or absence of cracks and the lengths of the cracks.

For example, in a case where cracks are specified to be present, it is determined to carry out the spray repair when the lengths of the cracks are equal to or smaller than a predetermined threshold value and to carry out the press-in repair when the lengths exceed the threshold value.

As previously described with reference to the graph shown in FIG. 3, the present inventors found that, in a case where the lengths of cracks before the spray repair are 20 mm or less, the propagation of the cracks is preferably suppressed by the spray repair, and, in a case where the lengths of cracks before a repair exceed 20 mm, the propagation of the cracks cannot be suppressed even when the spray repair is carried out. A threshold value of the lengths of cracks before the spray repair at which the propagation of the cracks is preferably suppressed by the spray repair varies depending on the dimensions of vacuum degassing tanks and immersion tubes and the material and dimensions of refractories. For the vacuum degassing tank used to produce FIG. 3, the threshold value of the lengths of cracks before the spray repair was 20 mm.

Therefore, in the repair technique determination step S4, it is preferable to produce a graph as in FIG. 3 and then set a predetermined threshold value for each of the vacuum degassing tanks. Specifically, as shown in FIG. 3, for cases where the spray repair is carried out, the relationship between "the lengths of cracks before a repair" and "the crack propagation rate" may be obtained by an experiment or simulation, and "the lengths of cracks before a repair" obtained when "the crack propagation rate" abruptly increases may be set as the threshold value. For example, the predetermined threshold value may be a value in a range of 10 mm to 30 mm or may be a value in a range of 15 mm to 25 mm.

Furthermore, in a case where it is determined that there are no cracks in the crack specification step S3 or a case where only cracks having a short length (for example, 5 mm or shorter) area specified, the following charge of RH degassing may be begun without carrying out any repairs.

In the diagnosis method including the above-described series of steps S1 to S4, the necessity of a repair and a repair technique are determined on the basis of the presence or absence of cracks and the lengths of the cracks, and thus it is possible to avoid consuming the repair time more than necessary. Therefore, it is possible to carry out repairs to the minimum necessary between the previous charge of RH degassing and the following charge of RH degassing, and thus it becomes possible to increase the efficiency of RH degassing.

Fourth Embodiment

In an RH degassing tank repair method according to a fourth embodiment of the present invention, the inner circumferential surfaces 104a (the lining refractories α) of the immersion tubes 104 are repaired on the basis of the repair technique determined in the above-described repair technique determination step S4.

At this time, it is preferable to repair not only the lining refractories α in the inner circumferential surfaces 104a of the immersion tubes 104 but also the lining refractory α in the lower portion tank 103 at the same time.

In a single RH degassing apparatus, a time necessary for the above-described image capturing step S1 to the repair technique determination step S4 is one minute to three minutes, and a time necessary for the spray repair is five minutes to ten minutes. In a continuous operation step, a time between the previous charge of RH vacuum degassing and the following charge of RH vacuum degassing is 15 minutes to 25 minutes, and thus it is possible to set a time for residual heat the RH degassing tank after the spray repair.

Hitherto, the present invention has been described on the basis of specific embodiments, but the present invention is not limited to the above-described embodiments, and the present invention can be modified in a variety of manners within the scope of the gist of the present invention.

In the above-described embodiments, the RH degassing tank 100 having two immersion tubes 104 is used as the vacuum degassing tank, but a DH degassing tank having only one immersion tube 104 may also be used as the vacuum degassing tank.

In the above-described embodiments, the table 13 to which the cameras 11 are fixed is used, but the cameras 11 may be directly fixed to the front end of the arm 15b in the configuration without using the table 13.

In the above-described embodiments, the cameras 11 directly capture the images of the inner circumferential surfaces 104a of the immersion tubes 104 seen from below at an angle, but the cameras may indirectly capture the images of the inner circumferential surfaces 104a of the immersion tubes 104 seen from below at an angle by using a heat-resistant mirror or the like.

In the above-described embodiments, the moving mechanism 15 rotates and moves the table 13 using the supporting column 15a and the arm 15b, but the moving mechanism 15 may be configured to move the table 13 straight.

In the above-described embodiments, the respective cameras 11 are separately stored in the storage cases 30, but the storage case 30 may store a plurality of cameras 11 by changing the planar shape in accordance with the disposition of the cameras.

In the above-described embodiments, the air cylinder 35c is used as the lid-opening and closing mechanism 35, but a fluid pressure cylinder may be used. In addition, the lid 33 may be configured to be slidden along the upper surface of the storage case 30 using an electric motor or the like without rotating the lid 33.

INDUSTRIAL APPLICABILITY

The diagnosis support apparatus of the present invention can be effectively used in vacuum degassing by the RH method, the DH method, or the like.

BRIEF DESCRIPTION OF THE REFERENCE SYMBOLS

10 DIAGNOSIS SUPPORT APPARATUS
11 CAMERA
13 TABLE
15 MOVING MECHANISM
15a SUPPORTING COLUMN
15b ARM
17 IMAGE PROCESSOR
19 MONITOR
30 STORAGE CASE
30a CIRCUMFERENTIAL WALL
30b TOP PLATE
31 HEAT-RESISTANT GLASS
33 LID
35 LID-OPENING AND CLOSING MECHANISM
35a FIRST PROTRUSION
35b SECOND PROTRUSION
35c AIR CYLINDER
35d HINGE
100 RH DEGASSING TANK
101 UPPER TANK
102 MIDDLE TANK
103 LOWER TANK
104 IMMERSION TUBE
104a INNER CIRCUMFERENTIAL SURFACE
104b OUTER CIRCUMFERENTIAL SURFACE
104c BOTTOM SURFACE
α LINING REFRACTORY
G GROUND SURFACE

What is claimed is:

1. A diagnosis support apparatus of a vacuum degassing tank having an immersion tube that extends downward, the apparatus comprising:
a camera that is configured to capture an image of an inner circumferential surface of the immersion tube seen from below at an angle in a state of being disposed outside the inner circumferential surface of the immersion tube in a plan view and acquire the image as data; and
an image processor that is configured to be connected to the camera and carry out image-processing of the data.

2. The diagnosis support apparatus according to claim 1, further comprising:
a table to which the camera is fixed; and
a moving mechanism that is configured to move the table between an image capturing position at which the camera is disposed at a position at which the camera is not overlaid by the inner circumferential surface of the immersion tube in the plan view and an evacuation position at which the camera is disposed at a position at which the camera is not overlaid by the vacuum degassing tank in the plan view.

3. The diagnosis support apparatus according to claim 2, wherein the moving mechanism includes
a supporting column that extends in a vertical direction, and
an arm that extends from the supporting column in a horizontal direction and is configured to support the table so as to be capable of circling around an axis of the supporting column.

4. The diagnosis support apparatus according to claim 2, further comprising:
a storage case that is fixed to the table and is configured to store the camera,
wherein at least a part of an upper surface of the storage case is heat-resistant glass.

5. The diagnosis support apparatus according to claim 4, wherein the storage case includes
a lid that is configured to cover at least a part of the heat-resistant glass, and
a lid-opening and closing mechanism that is configured to open and close the lid so that the lid is opened when the table is at the image capturing position and the lid is in a closed state when the table is being moved.

6. The diagnosis support apparatus according to claim 4, further comprising:
a gas supply mechanism that is configured to supply gas to an inside of the storage case.

7. The diagnosis support apparatus according to claim 4, further comprising:
a thermometer that is configured to measure a temperature of an inside of the storage case.

8. The diagnosis support apparatus according to claim 1, further comprising:
a camera control unit that is configured to capture a plurality of the images while changing an exposure time of the camera in a range of 5 ms to 300 ms.

9. The diagnosis support apparatus according to claim 1, wherein the camera image captures the inner circumferential surface of the immersion tube in a state of being disposed outside an outer circumferential surface of the immersion tube in the plan view.

10. The diagnosis support apparatus according to claim 1, wherein a plurality of the cameras is disposed around a central axis of the immersion tube in the plan view.

11. The diagnosis support apparatus according to claim 10, wherein the camera image captures a whole circumference of the inner circumferential surface of the immersion tube.

12. The diagnosis support apparatus according to claim 1, wherein the camera image captures, in the inner circumferential surface of the immersion tube, a region closest to a central axis of the vacuum degassing tank in the plan view.

13. The diagnosis support apparatus according to claim 1, wherein the vacuum degassing tank is an RH degassing tank having two immersion tubes.

14. A diagnosis support method of a vacuum degassing tank in which the diagnosis support apparatus according to claim 1 is used, the method comprising:
   capturing an image of the inner circumferential surface of the immersion tube seen from below at an angle using the camera and acquiring data; and
   image-processing the data acquired in the image capture using the image processor.

15. A diagnosis method of a vacuum degassing tank in which the diagnosis support apparatus according to claim 1 is used, the method comprising:
   capturing an image of the inner circumferential surface of the immersion tube seen from below at an angle using the camera and acquiring data;
   image-processing the data acquired in the image capture using the image processor;
   specifying presence or absence of cracks and lengths of the cracks in the inner circumferential surface of the immersion tube on the basis of the image-processed data; and
   determining a necessity of a repair and a repair technique depending on the presence or absence of the cracks and the lengths of the cracks specified in the specifying.

16. A repair method,
   wherein the inner circumferential surface of the immersion tube is repaired using the repair technique determined in the determining according to claim 15.

* * * * *